(12) United States Patent
Chang

(10) Patent No.: US 9,059,748 B2
(45) Date of Patent: Jun. 16, 2015

(54) REMOTE CONTROLLER WITH MAGNET

(71) Applicant: RHINE ELECTRONIC CO., LTD., Taichung (TW)

(72) Inventor: Yi Kai Chang, Taichang (TW)

(73) Assignee: RHINE ELECTRONIC CO., LTD., Taichung (TW)

( * ) Notice: Subject to any disclaimer, the term of this patent is extended or adjusted under 35 U.S.C. 154(b) by 150 days.

(21) Appl. No.: 13/867,468

(22) Filed: Apr. 22, 2013

(65) Prior Publication Data

US 2014/0313019 A1 Oct. 23, 2014

(51) Int. Cl.
| | |
|---|---|
| *G05B 11/01* | (2006.01) |
| *G05B 19/00* | (2006.01) |
| *F04B 35/04* | (2006.01) |
| *H04L 17/02* | (2006.01) |
| *H04B 1/034* | (2006.01) |

(52) U.S. Cl.
CPC .................................. *H04B 1/0346* (2013.01)

(58) Field of Classification Search
CPC ......... H04B 1/0346; F04B 35/04; G04F 8/00; H04N 5/44

USPC ....................................................... 340/12.55
See application file for complete search history.

(56) References Cited

U.S. PATENT DOCUMENTS

| | | | | |
|---|---|---|---|---|
| 6,015,274 | A | * | 1/2000 | Bias et al. ................... 417/423.1 |
| 6,946,988 | B2 | * | 9/2005 | Edwards et al. .............. 341/176 |
| 8,441,893 | B2 | * | 5/2013 | Stephens Stauffer et al. ............................. 368/107 |
| 2011/0043709 | A1 | * | 2/2011 | Hirata et al. .................. 348/734 |

\* cited by examiner

*Primary Examiner* — Brent Swarthout
*Assistant Examiner* — John Mortell
(74) *Attorney, Agent, or Firm* — Ming Chow; Sinorica, LLC

(57) ABSTRACT

A remote controller with magnet for ceiling fan and includes a transmitter body defining a compartment in which at least a magnet is installed. With the magnet installed therein, the transmitter body can readily attach to a flat surface of a ferric object. Alternatively, the transmitter body can be used with a holder defining a pocket in which a ferric plate is arranged. The transmitter body can magnetically attach to the ferric plate of the holder. By this arrangement, the transmitter body can readily stored within the pocket. This arrangement can effectively increase the convenience of the operation and usage. In addition, the overall configuration is simple and free from all kind of malfunction. It can be readily expected to reach its intended convenience and configurational stability.

3 Claims, 7 Drawing Sheets

REMOTE CONTROLLER WITH MAGNET

BACKGROUND OF THE INVENTION

1. Technical Field

The present invention relates to a remote controller, and more particularly to a remote controller for use with a ceiling fan and is adequately incorporated with a magnet.

2. Description of Prior Art

As a shown in FIG. 7, a conventional remote controller and it holder are shown. The holder 30 includes a pocket 31 having positioning tabs 310 arranged on sides. When the transmitter body 20 is disposed within the pocket 31, the transmitter body 20 will be snugly retained by the positioning tabs 310 of the pocket 31. However, the prior art has the following issues.

1. Poor convenience: the transmitter body has to be use together with the holder. The transmitter body is firstly disposed within the pocket, and then with the retention of the positioning tabs, the transmitter body can be securely retained therein. In use, the transmitter body has to be disposed within the pocket, and then to position the transmitter body with the positioning tabs. This is really inconvenient. As result, it is a poor convenience in use.

BRIEF SUMMARY OF THE INVENTION

In order to over the poor convenience of the prior art remote controller for ceiling fan, a remote controller incorporated with a magnet made in accordance with the present invention is therefore provided.

It is a main object of the present invention to provide a remote controller with a magnet for ceiling fan. It includes a transmitter body defining a compartment in which at least a magnet is installed. With the magnet installed therein, the transmitter body can readily attach to a flat surface of a ferric object. In addition, the transmitter body can be used with a holder defining a pocket in which a retaining portion is arranged on a rear side of the pocket. A ferric plate is disposed within the retaining portion. Since the compartment of the transmitter body is disposed with a magnet, it can readily attach to the ferric plate of the holder. By this arrangement, the transmitter body can be readily disposed within the pocket of the holder while without specially making any alignment therebetween. This arrangement can effectively increase the convenience of the operation and usage. In addition, the overall configuration is simple and free from all kind of malfunction. It can be readily expected to reach its intended convenience and configurational stability.

According to another object of the present invention, the retaining portion of the pocket of the holder is provided with a post, and the ferric plate is defined with a hole such that an interengagement between the hole and the post can be made therebetween.

According to another object of the present invention, the retaining portion is arranged on the rear side of the pocket.

According to another object of the present invention, the compartment is arranged on a back cover.

DETAILED DESCRIPTION OF THE INVENTION

In order to give a better and thorough understanding to the whole and other intended purposes, features and advantages of the technical solution of the present invention, detailed description will be given with respect to preferred embodiments provided and illustrated herebelow in accompanied drawings. Apparently, the embodiments illustrated below are merely by way of illustration, while should not be construed as any limitations to the appended claims.

Figure 1:
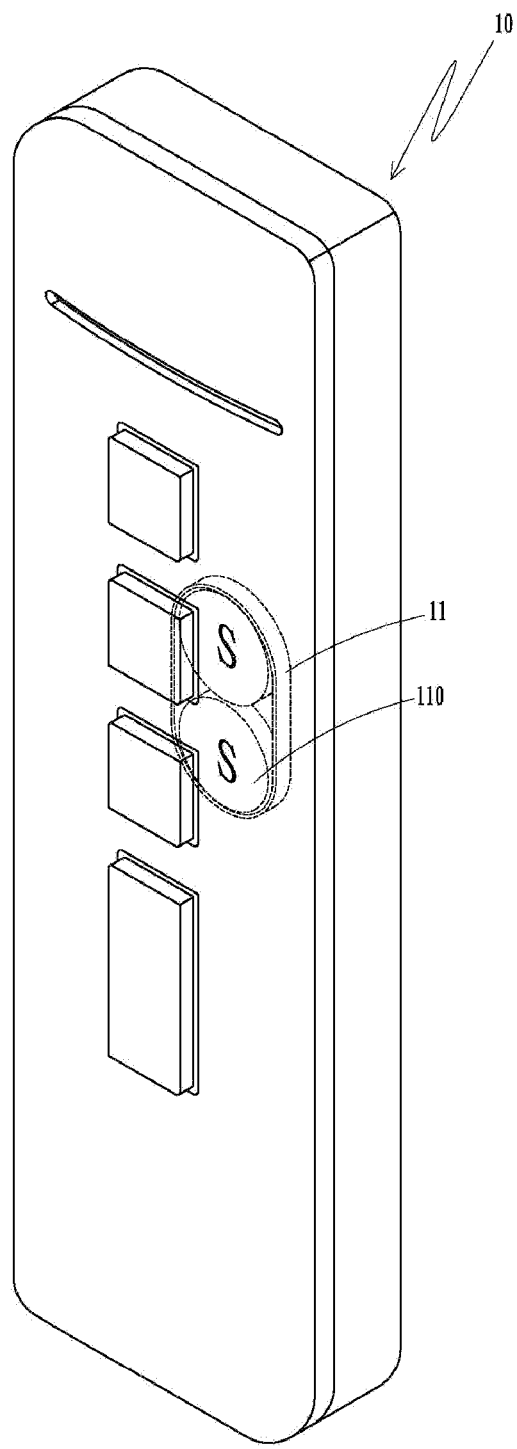
FIG. 1 is a perspective view of a remote controller made in accordance with the present invention.
Figure 2:
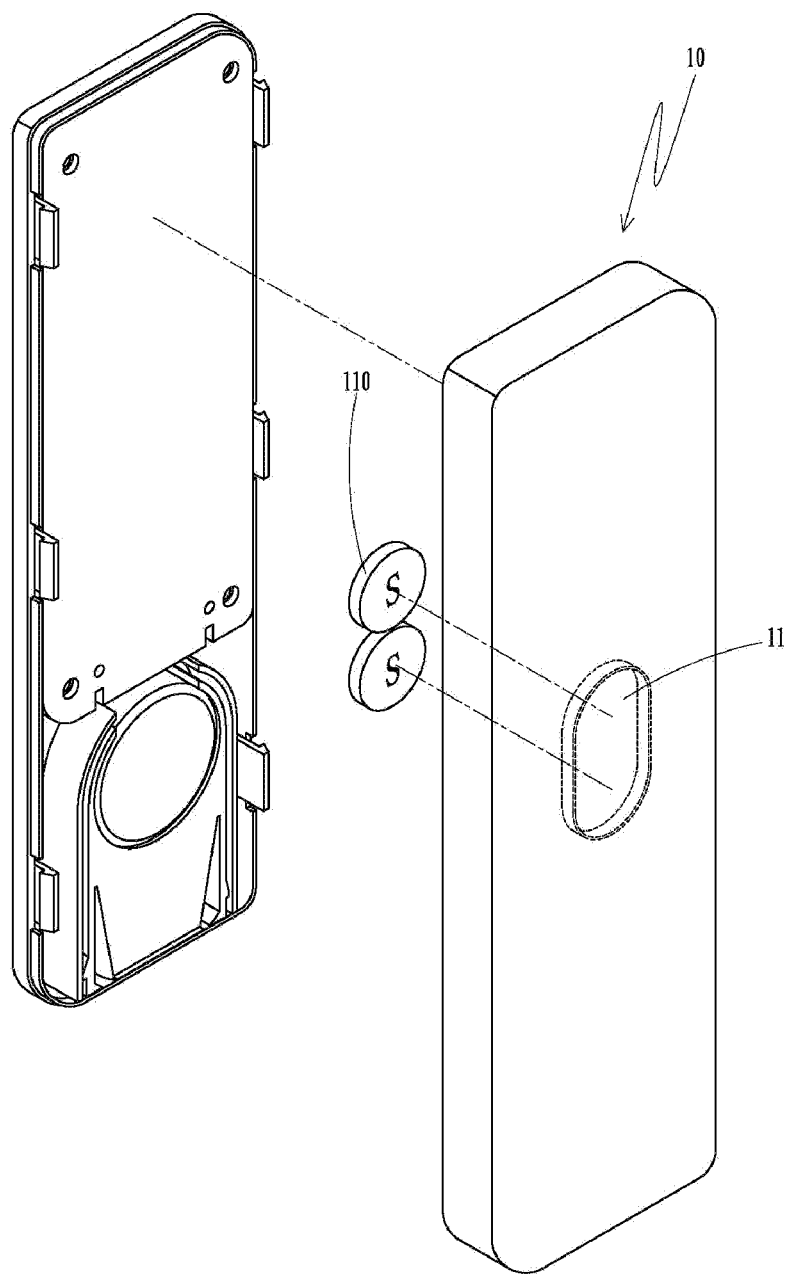
FIG. 2 is an exploded view of the remote controller shown in FIG. 1.
Figure 3:
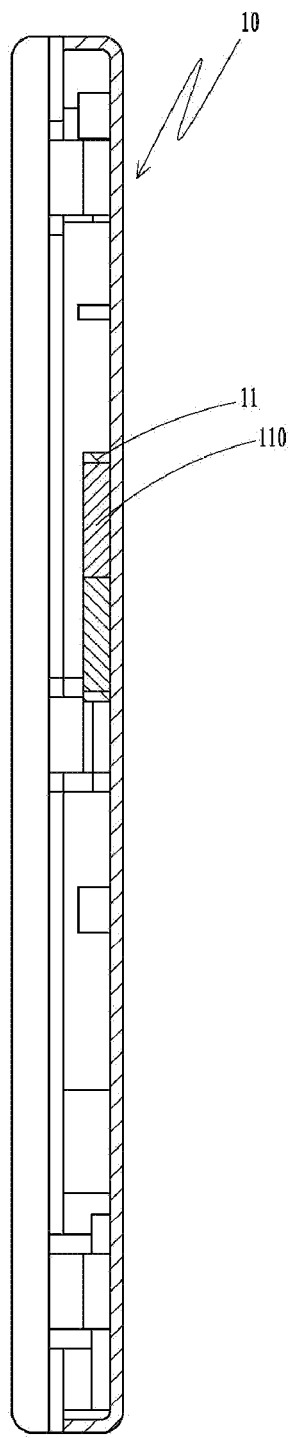
FIG. 3 is a cross sectional view of the remote controller made in accordance with the present invention.
Figure 4:
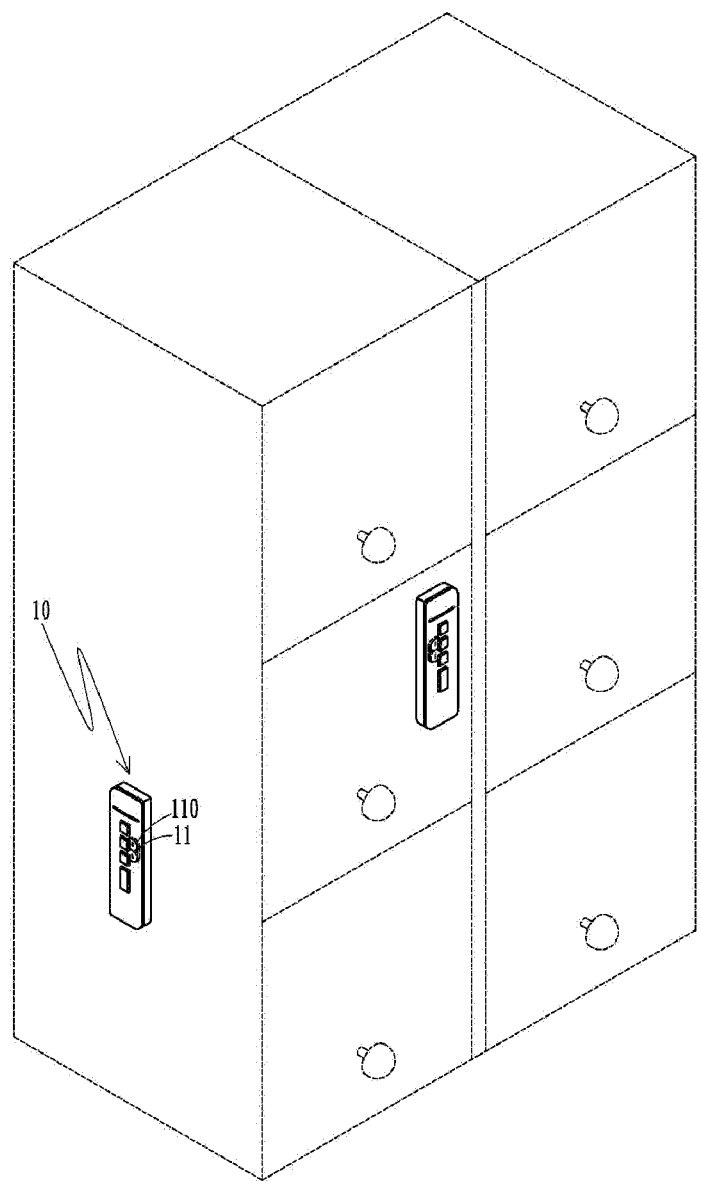
FIG. 4 is an illustrational view depicting the remote controller is attached to a metallic cabinet.
Figure 5:
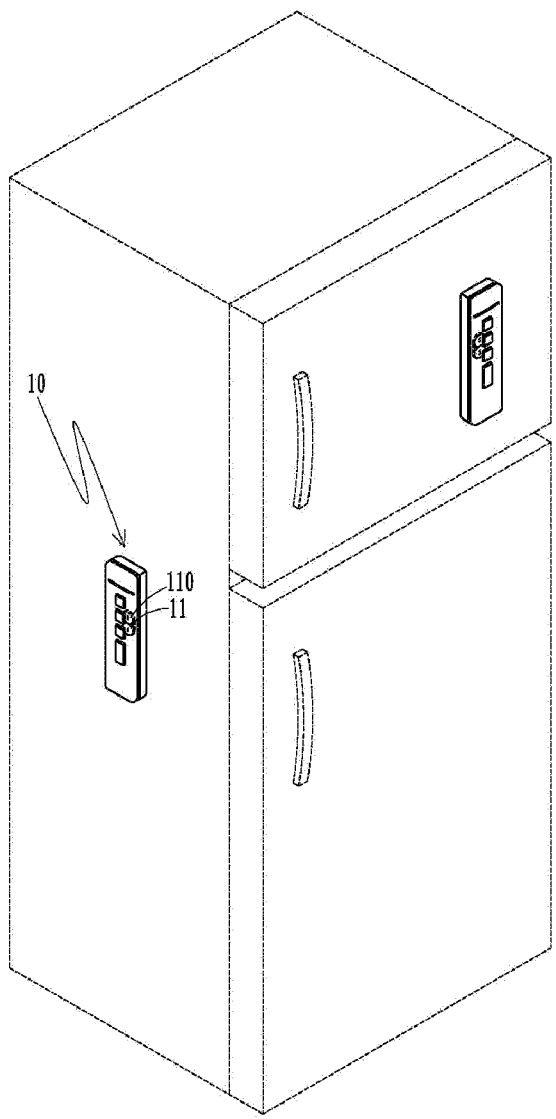
FIG. 5 is an illustrational view depicting the remote controller is attached to a refrigerator.

Referring to FIGS. 1 to 3, a perspective view of a remote controller made in accordance with the present invention; an exploded view of the remote controller shown in FIG. 1; and a cross sectional view of the remote controller made in accordance with the present invention are respectively shown.

The remote controller includes a transmitter body 10 defining a compartment 11 in which at least a magnet 110 is installed. The compartment 11 can be arranged in an internal or external side of the transmitter body 10.

By the provision and configuration described above, a remote controller with a magnet for ceiling fan is completed.

Referring to FIGS. 2 to 5, an exploded view of the remote controller shown in FIG. 1; a cross sectional view of the remote controller made in accordance with the present invention; an illustrational view depicting the remote controller is attached to a metallic cabinet; and an illustrational view depicting the remote controller is attached to a refrigerator are respectively shown. With the installation of the magnet 110 within the compartment 11 of the transmitter body 10, the transmitter body 10 can readily attach to a flat ferric surface (for example, a flat surface of a metallic cabinet or refrigerator) without any tedious effort to position the transmitter body 10. This is really convenient in use and easily to manipulate. With its simplified configuration, no malfunction would be encountered, and the service life can be prolonged. Accordingly, it can readily achieve the favorable function of easy to use and configurational stability.

Figure 6:
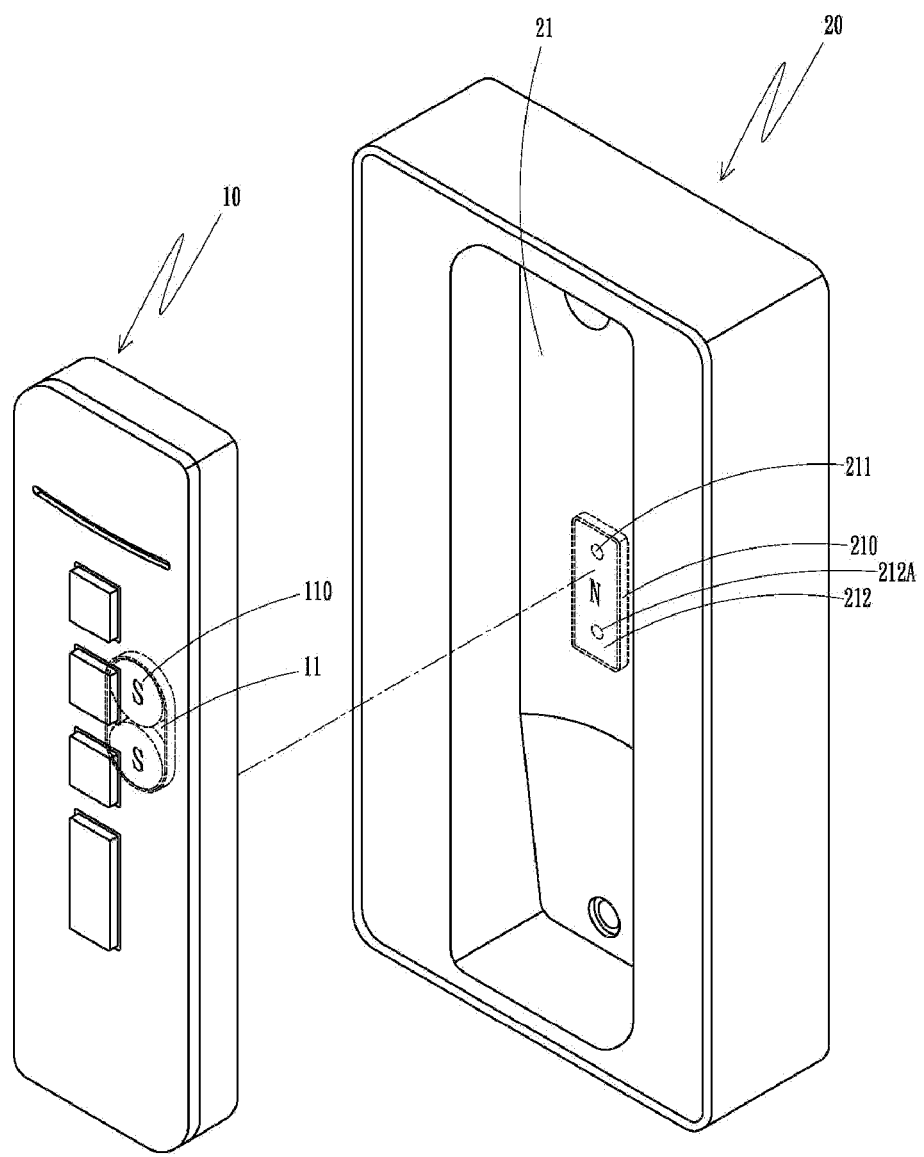
FIG. 6 is an illustrational and exploded view showing the transmitter body is separate from the holder.
Figure 7:
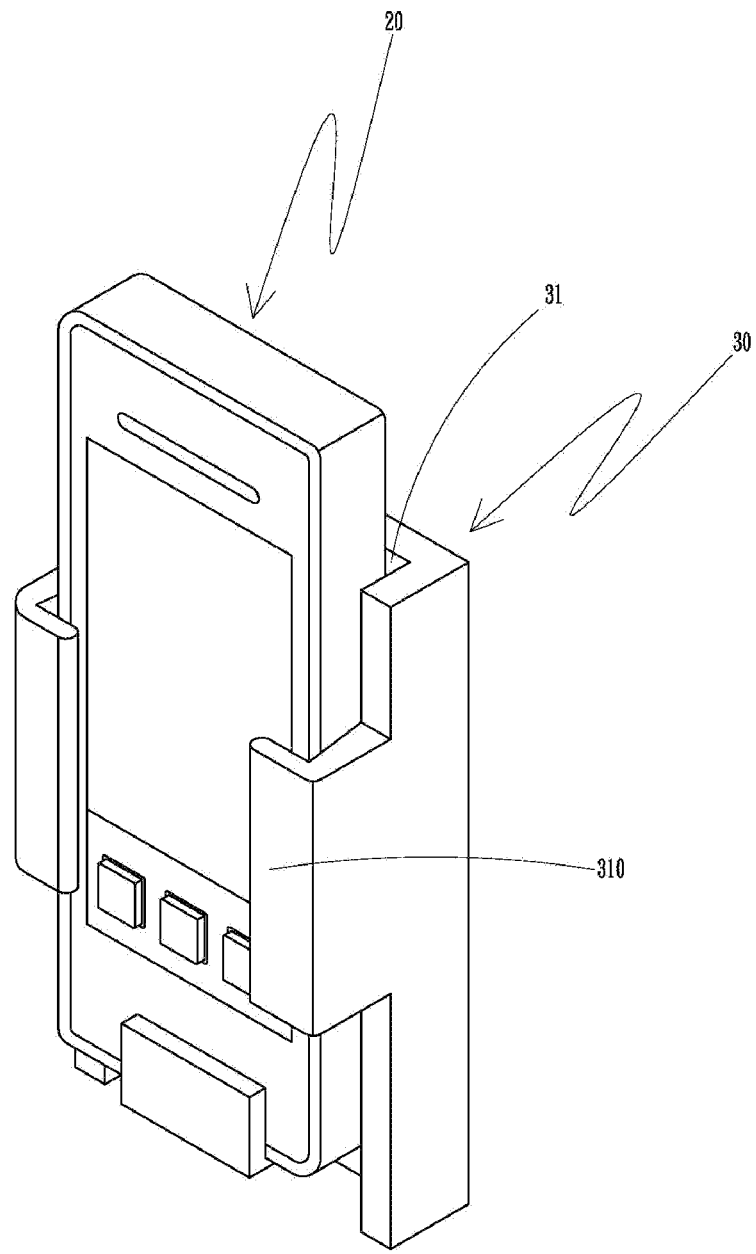
FIG. 7 is a prior art remote controller.

Referring to FIG. 6, which is an illustrational and exploded view showing the transmitter body is separate from the holder. The transmitter body 20 can be used with a holder 20 defining a pocket 21 therein. A retaining portion 210 is arranged on a rear side of the pocket 21 and at least a post 211 is formed therein. A ferric plate 212 is disposed within the retaining portion 210 and defines a hole 212A therein. When the ferric plate 212 is disposed within the retaining portion 210, the hole 212A of the ferric plate 212 can be engaged with the post 211 of the retaining portion 210. Wherein when the transmitter body 10 is disposed within the pocket 21, a back of the transmitter body 10 is facing to the pocket 21 of the holder 20 such that the magnet 110A of the transmitter body 10 will magnetically attract to the ferric plate 212 disposed in the retaining portion 210 of the pocket 21. As such, the transmitter body 10 can be readily stored within the pocket 21 of the holder 20. The versatile capability of the present invention is therefore increased.

The present invention can be concluded with the following advantages.

1. Excellent convenience: since the transmitter body can readily attach to any ferric surface, such as the metallic cabinet or refrigerator, or alternatively, it can be stored within a pocket of a holder. There is no need of accurate alignment therebetween, and the user can easily put the transmitter holder therein. This tremendously increases the convenience of the utilization as well as operation. It is concluded it has excellent convenience.

2. Excellent configurational stability: the transmitter body is incorporated with a magnet which can readily attach to a ferric surface, such as a metallic cabinet or a refrigerator, or alternatively, to use with a holder in which a pocket having a ferric plate is included. When the transmitter body is stored within the pocket, the magnet of the transmitter body can readily attach to the ferric plate of the holder so as to securely retain the transmitter body. The overall configuration is free from malfunction, and the service life is prolonged. As a result, it has excellent configuration stability.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A remote controller for ceiling fan, comprising:
   a transmitter body (10) defining a compartment (11) in which at least a magnet (110) is installed;
   a holder (20) defining a pocket (21);
   a retaining portion (210) is arranged on a rear side of the pocket (21);
   a ferric plate (212) being disposed within the retaining portion (210);
   when the transmitter body (10) is disposed within the pocket (21), a back of the transmitter body (10) is facing to the pocket (21) of the holder (20) such that the magnet (110) of the transmitter body (10) will magnetically attract to the ferric plate (212) disposed in the retaining portion (210) of the pocket (21);
   the holder (20) includes at least a post (211) in the retaining portion (210) in which the ferric plate (212) is disposed; and
   the ferric plate (212) defines at least a hole (212A) enveloping onto the post 211 of the retaining portion (210).

2. The remote controller as recited in claim 1, wherein the compartment (11) is arranged in an internal side of the transmitter body (10).

3. The remote controller as recited in claim 1, wherein the compartment (11) is arranged in an external side of the transmitter body (10).

* * * * *